(12) United States Patent
Wada et al.

(10) Patent No.: US 12,171,212 B2
(45) Date of Patent: Dec. 24, 2024

(54) MONITORING CAMERA WITH REPELLENT SHEET ADHERED TO TIP END FLANGE

(71) Applicant: i-PRO Co., Ltd., Fukuoka (JP)

(72) Inventors: Jyouji Wada, Fukuoka (JP); Hideki Yasuda, Fukuoka (JP); Masahito Oka, Fukuoka (JP); Toshiaki Ito, Fukuoka (JP); Eiji Takahashi, Fukuoka (JP)

(73) Assignee: I-PRO CO., LTD., Tokyo (JP)

( * ) Notice: Subject to any disclaimer, the term of this patent is extended or adjusted under 35 U.S.C. 154(b) by 154 days.

(21) Appl. No.: 17/900,054

(22) Filed: Aug. 31, 2022

(65) Prior Publication Data

US 2022/0408712 A1 Dec. 29, 2022

Related U.S. Application Data

(63) Continuation of application No. PCT/JP2021/001493, filed on Jan. 18, 2021.

(30) Foreign Application Priority Data

Mar. 3, 2020 (JP) ................................. 2020-035962

(51) Int. Cl.
*A01M 1/20* (2006.01)
*H04N 23/51* (2023.01)
*H04N 23/52* (2023.01)

(52) U.S. Cl.
CPC ........... *A01M 1/2011* (2013.01); *H04N 23/51* (2023.01); *H04N 23/52* (2023.01); *A01M 2200/011* (2013.01)

(58) Field of Classification Search
CPC .......... A01M 1/2011; A01M 2200/011; H04N 23/51; H04N 23/52
USPC ............................................................ 43/131
See application file for complete search history.

(56) References Cited

U.S. PATENT DOCUMENTS

| | | | | |
|---|---|---|---|---|
| 4,782,622 A | * | 11/1988 | Roberts ................. | A01M 25/00 114/221 R |
| 4,804,142 A | * | 2/1989 | Riley .................... | A01M 29/12 43/131 |
| 5,148,626 A | * | 9/1992 | Haake, Sr. ........... | A01M 1/2011 43/109 |

(Continued)

FOREIGN PATENT DOCUMENTS

| | | |
|---|---|---|
| CN | 204425481 | 6/2015 |
| CN | 204887200 | 12/2015 |

(Continued)

OTHER PUBLICATIONS

International Search Report issued in International Patent Application No. PCT/JP2021/001493, dated Mar. 30, 2021, along with an English translation thereof.

*Primary Examiner* — Brady W Frazier
(74) *Attorney, Agent, or Firm* — Greenblum & Bernstein, P.L.C.

(57) ABSTRACT

A monitoring camera includes a housing having a tip end cylindrical portion in which a lens is disposed, the tip end cylindrical portion being covered with a front glass, an eave member that is provided on an upper surface of the housing and that has a tip end flange portion protruding forward from the front glass, and a repellent member that is provided at the tip end flange portion and contains a drug for repelling a pest such as a spider.

6 Claims, 15 Drawing Sheets

(56) References Cited

U.S. PATENT DOCUMENTS

| | | | | |
|---|---|---|---|---|
| 5,155,950 | A * | 10/1992 | Burgeson | A41D 13/001 |
| | | | | 119/857 |
| 6,145,236 | A * | 11/2000 | King | A01M 29/34 |
| | | | | 43/132.1 |
| 2009/0272023 | A1 * | 11/2009 | Ramos-Santiago | A01M 29/34 |
| | | | | 43/131 |
| 2014/0267715 | A1 | 9/2014 | Kemege | |

FOREIGN PATENT DOCUMENTS

| CN | 111385453 | 7/2020 |
|---|---|---|
| DE | 20 2014 102 649 | 10/2015 |
| JP | 11-084525 | 3/1999 |
| JP | 2018-000144 | 1/2018 |
| JP | 2018-050247 | 3/2018 |
| KR | 10-1729061 | 4/2017 |

* cited by examiner

FIG. 5

| WIDTH OF A [mm] | EFFECT |
|---|---|
| LARGER OF 10 MM OR B/10 | ◎ |
| LARGER OF 5 MM OR B/20 | ○ |
| LARGER OF 3 MM OR B/30 | △ |

MONITORING CAMERA WITH REPELLENT SHEET ADHERED TO TIP END FLANGE

CROSS-REFERENCE TO RELATED APPLICATIONS

This is a continuation of International Application No. PCT/JP2021/001493 filed on Jan. 18, 2021, and claims priority from Japanese Patent Application No. 2020-035%2 filed on Mar. 3, 2020, the entire content of which is incorporated herein by reference.

TECHNICAL FIELD

The present disclosure relates to a monitoring camera.

BACKGROUND ART

A monitoring camera that is often used outdoors captures an image of an area to be monitored through a camera lens or a front glass covering the camera lens. Since such a monitoring camera is used outdoors, a spider web may be set up in front of the front glass or the like. In the monitoring camera, when an obstacle such as a spider web is present in front of the front glass, imaging light is blocked, and image quality of a subject to be imaged deteriorates. Therefore, the obstacle such as a spider web is manually removed, but this is a dangerous task because it takes time and effort and an installation position of the monitoring camera is often high.

PTL 1 discloses a camera housing for automatically removing an obstacle in front of a front glass. In the camera housing, an impeller is rotated by wind power, and a rotary plate attached to a lower portion of the impeller is rotated to remove a spider web. The camera housing houses a television camera to be used, and includes the impeller that is provided in front of the camera housing and is rotated by wind power, and the rotary plate that is rotated in front of the camera housing by the rotation of the impeller. The rotary plate is rotated by wind power to remove a field-of-view obstacle on a front surface of the camera housing.

CITATION LIST

Patent Literature

[PTL 1]: JP-H11-84525-A

SUMMARY OF INVENTION

Technical Problem

Since the camera housing in the related art described above removes an obstacle in front of the camera housing by using wind power, there is a problem that a spider web may be set up when the rotary plate is not rotated in a case where there is no wind.

A monitoring camera can analyze a captured image and detect a moving object (for example, a suspicious person) in the image. In this kind of monitoring camera, after a moving object is detected, an alarm is issued in response to the detection of the moving object. Therefore, in particular in the night, when a spider web or a prey entangled in the spider web, or the like is moved due to wind, it may be erroneously analyzed that a moving object is detected due to reflected light obtained by the spider web or the prey or the like reflecting illumination light used for imaging, and monitoring accuracy may deteriorate because a false alarm is issued. For example, when an erroneous report is transmitted to a security company or the like, an unnecessary action or the like may be performed. In the camera housing described above as well, in a case where the spider web that was set up is moved by the rotation of the rotary plate when the spider web is to be removed, it may be erroneously analyzed that a moving object is detected in the same manner, and monitoring accuracy may deteriorate because a false alarm is issued.

The present disclosure has been made in view of circumstances described above in the related art, and an object of the present disclosure is to provide a monitoring camera that prevents deterioration of image quality of a captured image and deterioration of monitoring accuracy.

Solution to Problem

The present disclosure provides a monitoring camera. The monitoring camera includes a housing having a tip end cylindrical portion in which a lens is disposed, the tip end cylindrical portion being covered with a front glass, an eave member that is provided on an upper surface of the housing and that has a tip end flange portion protruding forward from the front glass, and a repellent member that is provided at the tip end flange portion and contains a drug for repelling a pest such as a spider.

The present disclosure provides a monitoring camera. The monitoring camera includes a housing having a tip end cylindrical portion in which a lens is disposed, the tip end cylindrical portion being covered with a front glass, an eave member that is provided on an upper surface of the housing and that has a tip end flange portion protruding forward from the front glass, and a rod-shaped repellent member that is made of a resin, protrudes forward from an upper surface of the tip end flange portion, and contains a drug for repelling a pest such as a spider.

Further, the present disclosure provides a monitoring camera. The monitoring camera includes a housing having a tip end cylindrical portion in which a lens is disposed, the tip end cylindrical portion being covered with a front glass, an eave member that is provided on an upper surface of the housing and that has a tip end flange portion protruding forward from the front glass, a case attached to an upper surface of the tip end flange portion, a tape cartridge that is mounted in the case and has a supply reel and a winding reel, the supply reel around which a tip end of a repellent member is wound, the repellent member being a long tape and containing a drug for repelling a pest such as a spider, the winding reel to which the tip end of the repellent member is fixed, a winding motor that is provided in the case and rotationally drives the winding reel in a tape winding direction, and a tape guide of which a base end is fixed to the case, that sandwiches the tip end cylindrical portion by covering each of substantially halves of an outer periphery of the tip end cylindrical portion and that guides the repellent member between the supply reel and the winding reel to travel along the outer periphery of the tip end cylindrical portion.

Advantageous Effects of Invention

According to the present disclosure, it is possible to prevent deterioration of image quality of a captured image and deterioration of monitoring accuracy.

BRIEF DESCRIPTION OF DRAWINGS

FIG. 5 is a correlation diagram showing experimental results of a width of a tape member and a repelling effect.

DESCRIPTION OF EMBODIMENTS

Hereinafter, embodiments in which a monitoring camera according to the present disclosure is specifically disclosed will be described in detail with reference to the drawings as appropriate. Unnecessarily detailed description may be omitted. For example, detailed description of a well-known matter or repeated description of substantially the same configuration may be omitted. This is to avoid unnecessary redundancy in the following description and to facilitate understanding for those skilled in the art. The accompanying drawings and the following description are provided for those skilled in the art to fully understand the present disclosure, and are not intended to limit the subject matter described in the claims.

First Embodiment

Figure 1:
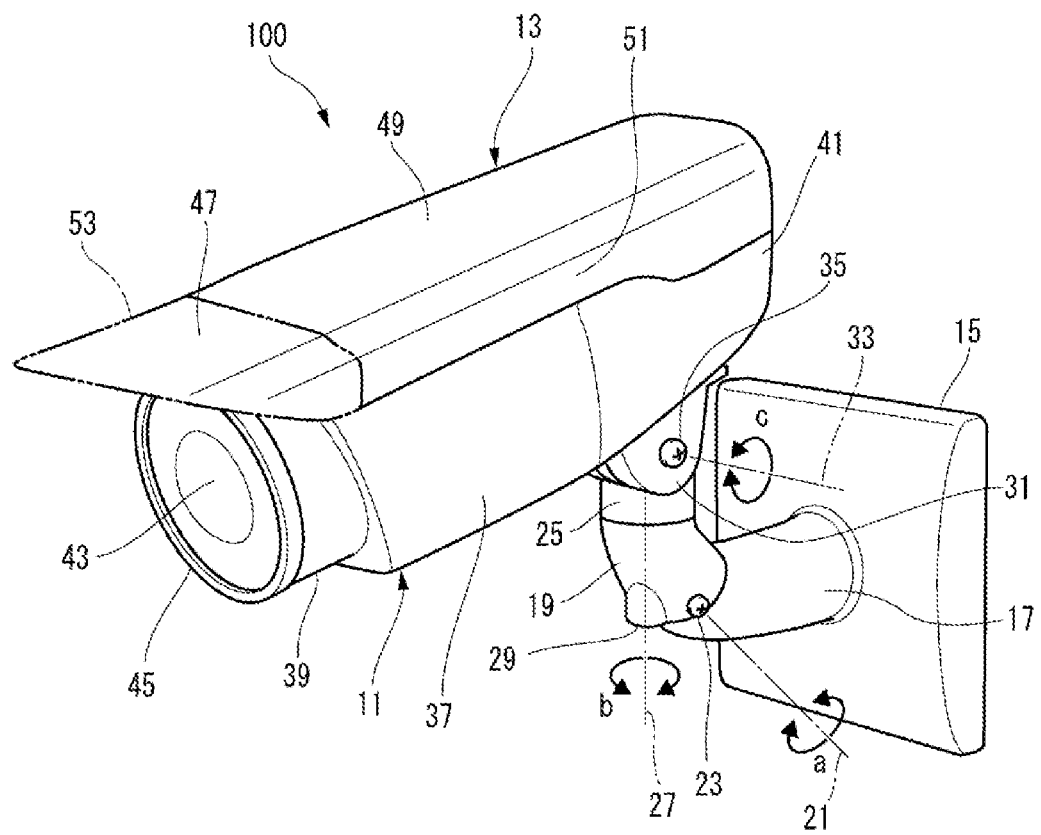
FIG. 1 is a perspective view showing an appearance of a monitoring camera 100 according to a first embodiment.

First, a monitoring camera 100 according to a first embodiment will be described. FIG. 1 is a perspective view showing an appearance of the monitoring camera 100 according to the first embodiment. The monitoring camera 100 according to the first embodiment is of a box type. The monitoring camera 100 is installed, for example, outdoors. The monitoring camera 100 may be installed indoors such as in a factory or in a warehouse.

Main components of the monitoring camera 100 include a housing 11, an eave member 13, and a repellent member.

The housing 11 is fixed to an outer wall surface such as an outer wall of a building via a base portion 15. A vertically protruding support rod 17 is provided at a substantially central portion or a central portion of the base portion 15. A base side bracket 19 is supported at a tip end of the support rod 17 in a manner of being rotatable about a first rotation shaft 21. The first rotation shaft 21 is inclined forward at a predetermined angle (about 45 degrees) relative to the above-described outer wall surface (along a vertical surface). The support rod 17 and the base side bracket 19 rotate in a rotation direction a around the first rotation shaft 21. This rotation can be fixed by a fixing screw 23. A camera side bracket 25 is supported at a tip end of the base side bracket 19 in a manner of being rotatable about a second rotation shaft 27. The second rotation shaft 27 extends in a direction along the outer wall surface. The base side bracket 19 and the camera side bracket 25 rotate in a rotation direction b around the second rotation shaft. This rotation can be fixed by a fixing screw 29. A camera base 31 is supported at an upper end of the camera side bracket 25 in a manner of being rotatable about a tilt shaft 33. The camera side bracket 25 and the camera base 31 rotate in a rotation direction c around the tilt shaft. This rotation can be fixed by a fixing screw 35.

The monitoring camera 100 can set an imaging direction to any direction in front of the base portion 15 by combining a rotation about the first rotation shaft 21, a rotation about the second rotation shaft 27, and a rotation about the tilt shaft 33. The rotation about the first rotation shaft 21, the rotation about the second rotation shaft 27, and the rotation about the tilt shaft 33 are restricted to a rotation angle of 360 degrees or less.

The housing 11 includes a main body case 37 that has a substantially rectangular parallelepiped shape and is supported by the camera base 31. A tip end cylindrical portion 39 that has a substantially cylindrical shape and is a front case is provided at a front portion of the main body case 37. A back cover 41 is provided at an opposite side of the tip end cylindrical portion 39 across the main body case 37. In the housing 11, the tip end cylindrical portion 39 in which a camera lens 43 (an example of a lens) is disposed is closed by a front glass 45. Inside the front glass 45, an infrared light radiation unit (not shown) is disposed along an outer periphery of the camera lens 43. The infrared light radiation unit includes a light emission diode (LED) for nighttime illumination. A transparent resin molded product, a transparent resin plate, or the like may be used instead of the front glass 45 to close the tip end cylindrical portion 39 from the outside.

The eave member 13 is provided on an upper surface of the housing 11, and the eave member 13 is a sunshade for preventing incidence of external light such as sunlight on the camera lens 43. The eave member 13 has a tip end flange portion 47 protruding forward from the front glass 45. The eave member 13 is formed to have a rectangular plate portion 49 that is long in a camera front-rear direction and covers the upper surface of the housing 11. A tip end side of the rectangular plate portion 49 is the tip end flange portion 47. The rectangular plate portion 49 includes a pair of side plate portions 51 that are bent downward from long side portions at both sides of the rectangular plate portion 49 and cover upper portions of the tip end cylindrical portion 39, the main body case 37, and the back cover 41. A portion of the rectangular plate portion 49 that covers the tip end cylindrical portion 39 serves as the tip end flange portion 47. Each of the side plate portions 51 has an inclined side that gradually comes close to the tip end flange portion 47 toward a tip end and a bent portion is eliminated at the tip end flange portion 47.

The tip end flange portion 47 is provided with a repellent member. The repellent member is formed to contain a drug (insect repellent component) that prevents the approach of pests such as a spider. The drug is effective not only for a spider but also effective for a cockroach, an ant, a centipede, a small animal such as a mice, a pest, or the like. The drug is a pest repellent composition using a naturally derived component, and can release a pest repellent component not only in a place of normal temperature and normal humidity but also in a place of high temperature and high humidity, and can exhibit a pest repelling effect over a long period of time.

For example, ARINIX (registered trademark) manufactured by NIX incorporation or the like can be used as the repellent member containing the drug. Examples of the pest repellent composition having a naturally derived component include: hinokitiol contained in Taiwan hinoki, asunaro, hinoki asunaro (Aomori hiba), or the like; a cadinol derivative (α-cadinol, T-cadinol) contained in hinoki; geraniol, pinene, carvophyllene, borneol, eugenol, and the like that are abundant in perfume plants such as clove, nutmeg, coriander, cumin, and the like.

Figure 2:
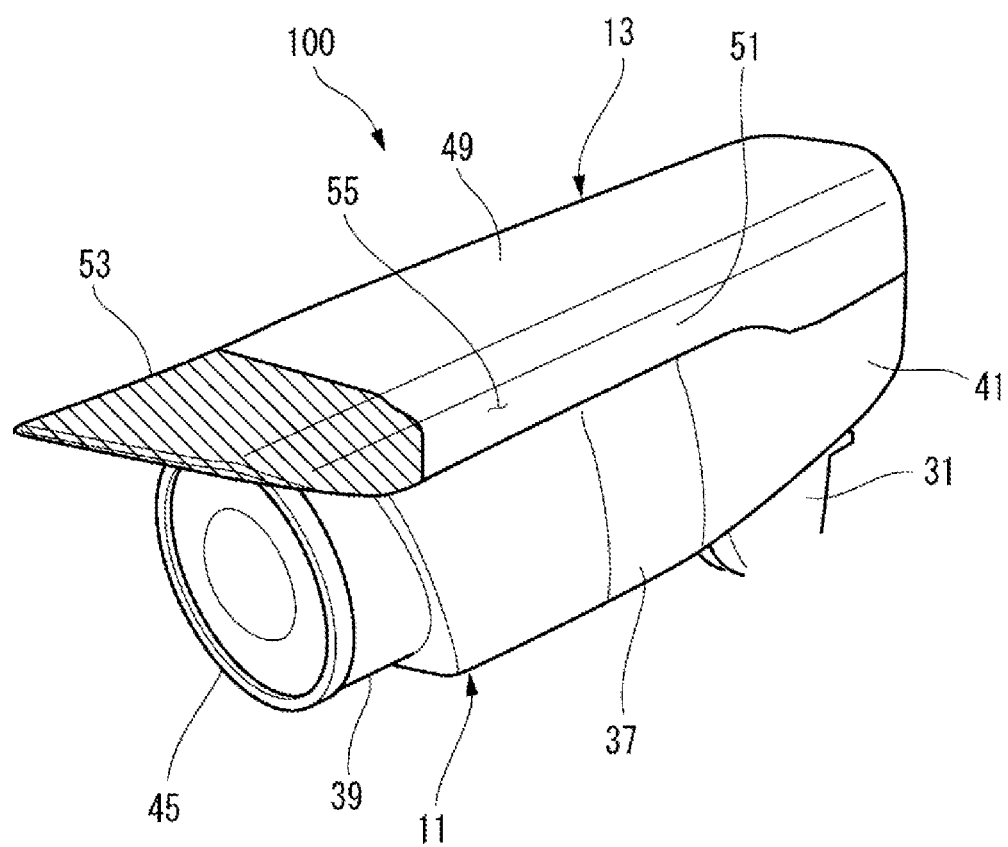
FIG. 2 is an enlarged view showing main parts of the monitoring camera 100 shown in FIG. 1.

FIG. 2 is an enlarged view showing main parts of the monitoring camera 100 shown in FIG. 1. In the monitoring camera 100 according to the first embodiment, the repellent member is a sheet member 53. For example, the sheet member 53 is formed into a translucent thin sheet shape (about 0.2 mm). An adhesive layer is provided on one surface of the sheet member 53. The adhesive layer may be provided on one sheet surface by coating or the like, or a double-sided adhesive sheet may be attached. A release paper is bonded to the adhesive surface, and the sheet member 53 is easily attached to the tip end flange portion 47 by peeling off the release paper.

Figure 3:
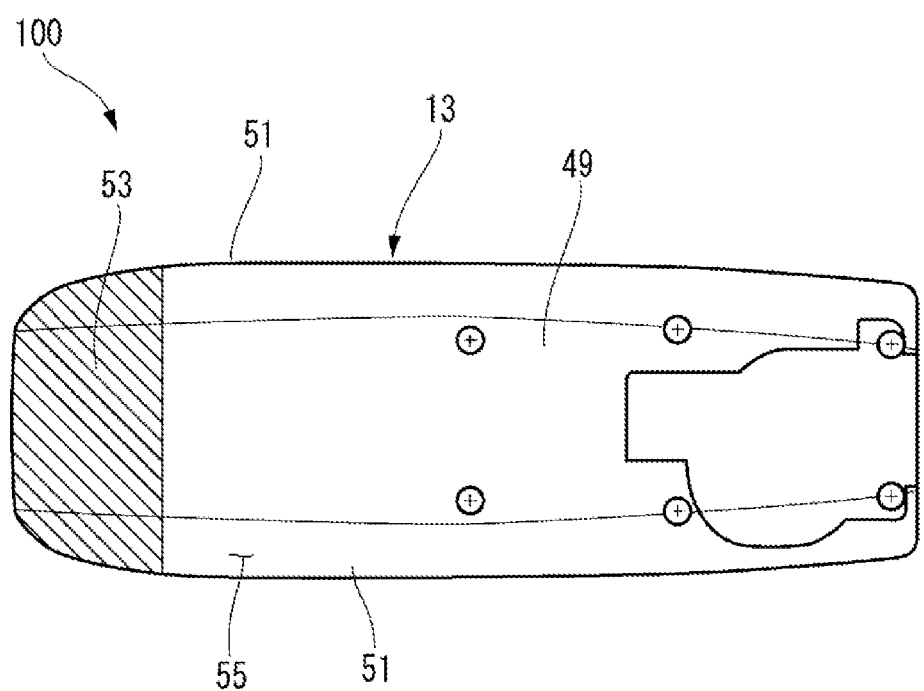
FIG. 3 is a plan view of FIG. 2.

FIG. 3 is a plan view of FIG. 2. The sheet member 53 is bonded to at least an upper surface of the tip end flange portion 47 and a side surface 55 of the tip end flange portion 47. Since the side plate portions 51 are bent downward from both sides of the tip end flange portion 47, the sheet member 53 is cut out to have a single stretched shape including the tip end flange portion 47 and a pair of side plate portions 51, and is continuously bonded to the tip end flange portion 47 and the side plate portions 51 at both sides without a seam. Although an example in which the sheet member 53 is bonded to the tip end flange portion 47 and the side plate portions 51 is described in the first embodiment, the sheet member 53 may be bonded to the entire upper surface of the eave member 13 and all of the side plate portions 51. In addition, the sheet member 53 may be bonded to a lower surface of the tip end flange portion 47.

Figure 4:
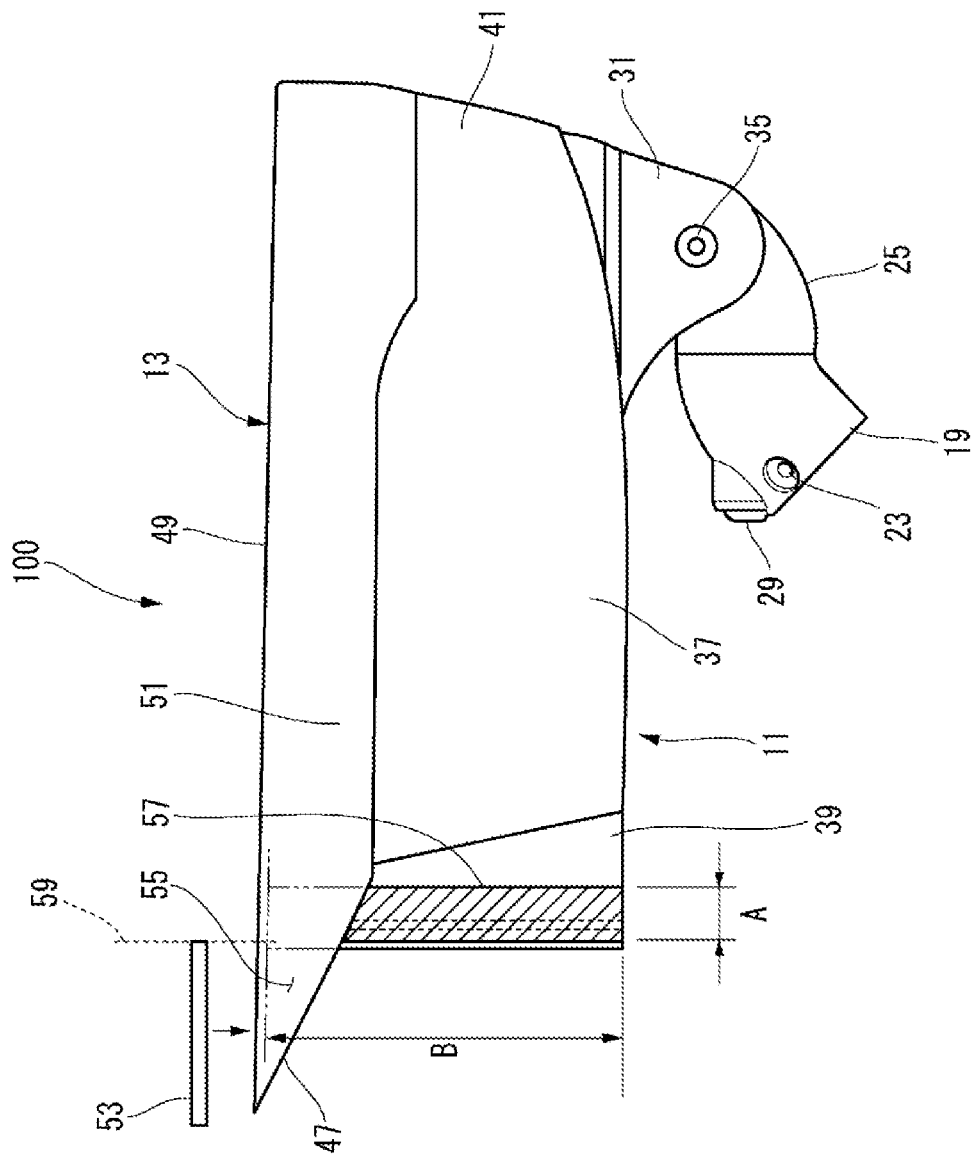
FIG. 4 is a side view of FIG. 2.

FIG. 4 is a side view of FIG. 2. In the monitoring camera 100, a tape member 57 that is formed into a band shape and contains the drug having the same effect as described above may be bonded to an outer periphery of the tip end cylindrical portion 39 having a diameter B. The tape member 57 includes an adhesive layer on one surface of the tape member 57, and is bonded to the entire outer periphery of the tip end cylindrical portion 39. The sheet member 53 is bonded such that a sheet member tip end position coincides with a tip end of the tip end flange portion 47. A tape member tip end position of the tape member 57 coincides with a sheet member rear end position 59. The tape member 57 is formed to have a predetermined width A from the tape member tip end position.

FIG. 5 is a correlation diagram showing experimental results of a width of the tape member 57 and a repelling effect. In the tape member 57 bonded to the outer periphery of the tip end cylindrical portion 39, the width A is set to a value of 10 mm or 1/10 of the diameter B of the tip end cylindrical portion 39, whichever is greater, based on the experimental results. As shown in FIG. 5, when the width A of the tape member 57 has a larger of 3 mm or 1/30 of the diameter B of the tip end cylindrical portion 39, an effect is considerably lower than an effect in a case where the width A has a larger of 10 mm or 1/10 of the diameter B of the tip end cylindrical portion 39. When the width A of the tape member 57 has a larger of 5 mm or 1/20 of the diameter B of the tip end cylindrical portion 39, an effect is lower than the effect in a case where the width A has a larger of 10 mm or 1/10 of the diameter B of the tip end cylindrical portion 39, but a certain effect of repelling pests such as a spider is obtained. Further, it has been found that the tape member 57 has a reliable and sufficient effect when the width A is set to a value of 10 mm or 1/10 of the diameter B of the tip end cylindrical portion 39, whichever is larger.

Next, an operation of the monitoring camera 100 according to the first embodiment will be described.

The monitoring camera 100 according to the first embodiment includes the housing 11 in which the front glass 45 closes the tip end cylindrical portion 39 in which a lens (for example, the camera lens 43) is disposed, the eave member 13 that is provided on the upper surface of the housing 11 and of which the tip end flange portion 47 protrudes forward from the front glass 45, and the repellent member that is provided at the tip end flange portion 47 and contains a drug for repelling a pest such as a spider.

In the monitoring camera 100 according to the first embodiment, a camera including the camera lens 43 is housed in the housing 11. The housing 11 has, for example, the cylindrical tip end cylindrical portion 39 at a tip end of the box-shaped main body case 37. The camera lens 43 is disposed inside the tip end cylindrical portion 39 along an optical axis and on the axis. The tip end cylindrical portion 39 is closed by the front glass 45 in front of the camera lens 43. That is, in the monitoring camera 100, the camera lens 43 forms an image on a light receiving surface of an imaging element using light passing through the front glass 45. Instead of the front glass 45, the camera lens 43 may be disposed at the forefront of the camera. In addition, the housing 11 may include an LED for nighttime illumination.

The eave member 13 having the tip end flange portion 47 is provided on the upper surface of the housing 11. When the eave member 13 is attached to the upper surface of the housing 11, the tip end flange portion 47 is disposed in a manner of protruding forward from the front glass 45. Accordingly, the eave member 13 can shield external light such as sunlight that is directly incident on the camera lens 43.

The tip end flange portion 47 is provided with the repellent member. The repellent member is formed to contain a drug that suppresses the approach of spiders. The repellent member may be, for example, the sheet member 53, the tape member 57, a bar, or a long tape member formed by adding a drug to plastic.

In the monitoring camera 100, since the repellent member is provided on the upper surface of the tip end flange portion 47, no spider is likely to come close to the tip end flange portion 47 that protrudes upward in front of the front glass 45. Since no spider comes close to the tip end flange portion 47, base yarns (yarns roughly stretched from the center of a web serving as a base when weft yarns of a circular web are to be set up) or the like are not set up. As a result, it is less likely to set up a spider web that is stretched from at least the tip end flange portion 47 and serves as an obstacle in front of the front glass 45. These effects are considered to be similar not only to a circular web but also to other types of nets such as an inventory net, an irregular net, a dish net, a fan net, and a strip net.

As a result, since an obstacle such as a spider web is less likely to be set up in front of the front glass 45, blocking of imaging light is prevented, and deterioration of image quality of a subject is prevented in the monitoring camera 100.

Since it is not necessary to manually remove the obstacle such as a spider web, it is possible to significantly reduce the labor of maintenance work for maintaining a monitoring function and the risk of work at height.

In addition, since an obstacle such as a spider web is less likely to be set up in front of the camera lens 43, it is less likely that a moving object detection sensor is operated due to imaging light since the spider web or a prey entangled in the spider web, or the like is moved due to wind. As a result, it is possible to prevent the issuing of a false alarm and it is possible to prevent deterioration of monitoring accuracy.

In the monitoring camera 100, the repellent member is the sheet member 53 that is formed into a sheet shape and has an adhesive layer on one surface. The sheet member 53 is bonded to at least an upper surface and the side surface 55 of the tip end flange portion 47.

In the monitoring camera 100, the sheet member 53 containing a drug for repelling a spider is bonded to the upper surface and the side surface 55 of the tip end flange portion 47 via the adhesive layer. Only by bonding the sheet member 53, it is possible to prevent an approaching of spider from coming closer to the tip end flange portion 47 that protrudes upward in front of the glass. Since no spider comes close to the tip end flange portion 47, base yarns or the like are not set up, and it is less likely to set up a spider web that is stretched from at least the tip end flange portion 47 and serves as an obstacle in front of the front glass 45.

Since the repellent member is the sheet member 53 in the monitoring camera 100, the repellent member is inconspicuous, and the appearance of the monitoring camera 100 is not impaired. In addition, the repellent member can be made inexpensive. The sheet member 53 can be easily bonded to the eave member 13 by covering the adhesive layer with a release paper in a separable manner and cutting the adhesive layer into a predetermined shape. Since there is no protruding member from the housing 11, there is no vibration of the housing 11 caused by a wind pressure acting on the repellent member.

In the monitoring camera 100, the tape member 57 that is formed into a band shape, contains a drug, and has an adhesive layer on one surface is bonded to the outer periphery of tip end cylindrical portion 39.

In the monitoring camera 100, in addition to the sheet member 53 bonded to the tip end flange portion 47, the tape member 57 containing a drug for repelling a spider is bonded to the outer periphery of the tip end cylindrical portion 39. As a result, no spider comes close to the front glass 45, and it is less likely to set up a spider web serving as an obstacle in front of the front glass 45.

In the monitoring camera 100, a width of the tape member 57 has a value of 10 mm or 1/10 of the diameter of the tip end cylindrical portion 39, whichever is greater.

In the monitoring camera 100, the width A of the tape member 57 is set to 10 mm or more, so that a repelling effect can be ensured. In the monitoring camera 100 in which the diameter B of the tip end cylindrical portion 39 is 100 mm or more, a large spider web may be set up. Even in this case, since the tape member 57 is ensured to have a width having a value of 1/10 of the diameter B of the tip end cylindrical portion 39, it is possible to increase the width A according to the size of the spider, and the repelling effect can be improved.

Next, a monitoring camera 100A according to a modification of the first embodiment will be described.

Figure 6:
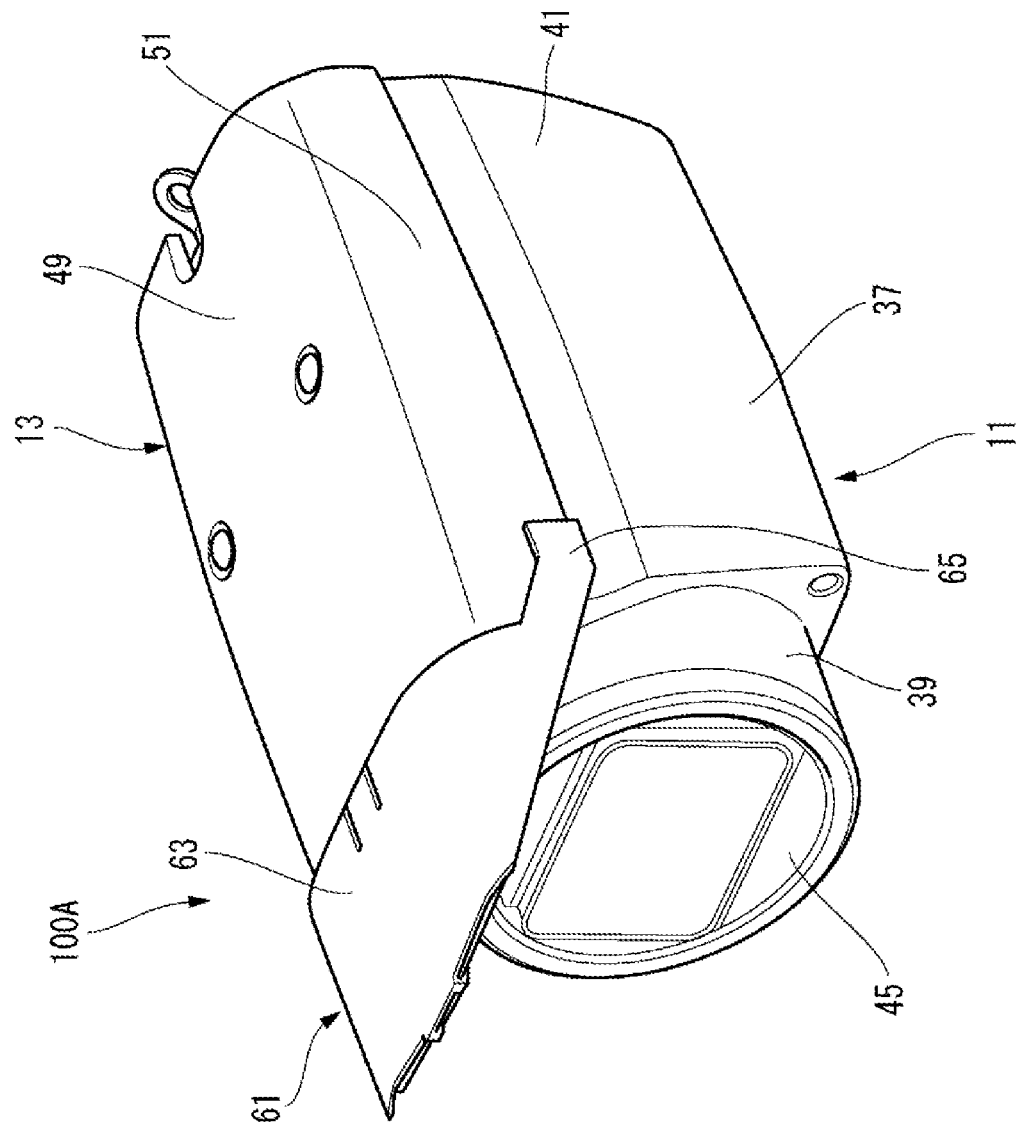
FIG. 6 is a perspective view showing a monitoring camera 100A according to a modification of the first embodiment.

FIG. 6 is a perspective view showing the monitoring camera 100A according to the modification of the first embodiment. In the monitoring camera 100A according to the modification of the first embodiment, the repellent member is a cap member 61 that is made of resin and is molded to contain a drug. The cap member 61 is detachably attached to an upper surface of the tip end flange portion 47.

The cap member 61 is mounted in a manner of covering the tip end flange portion 47 of the eave member 13 and the side plate portions 51 at both sides of the tip end flange portion 47. In the cap member 61, a pair of side plate locking arms 65 that can be locked to the side plate portions 51 at both sides are formed at both sides of a rear end of a cap main body portion 63 that has substantially the same shape as the tip end flange portion 47.

Figure 7:
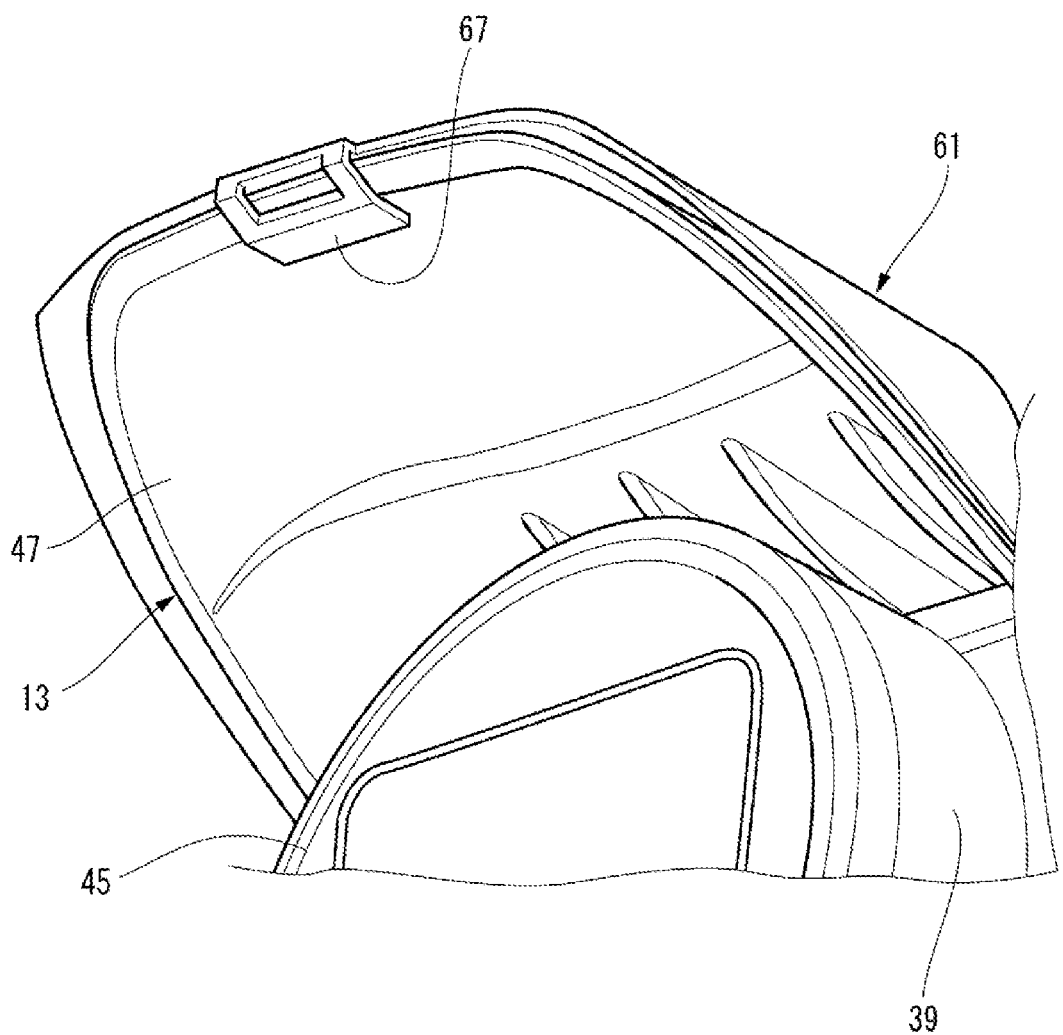
FIG. 7 is a perspective view showing a tip end flange portion of the monitoring camera 100A according to the modification of the first embodiment as viewed from below.

FIG. 7 is a perspective view showing the tip end flange portion 47 of the monitoring camera 100A according to the modification of the first embodiment as viewed from below. An outer shape of the cap member 61 is formed to slightly extend from an outer shape of the tip end flange portion 47. As a result, a pest such as a spider is less likely to set up base yarns. A tip end locking plate 67 is formed at the center of a tip end of the cap main body portion 63. The tip end locking plate 67 sandwiches a tip end of the tip end flange portion 47 at a tip end of the cap main body portion 63. As a result, the cap member 61 is restricted from coming off rearward and rising upward.

Figure 8:
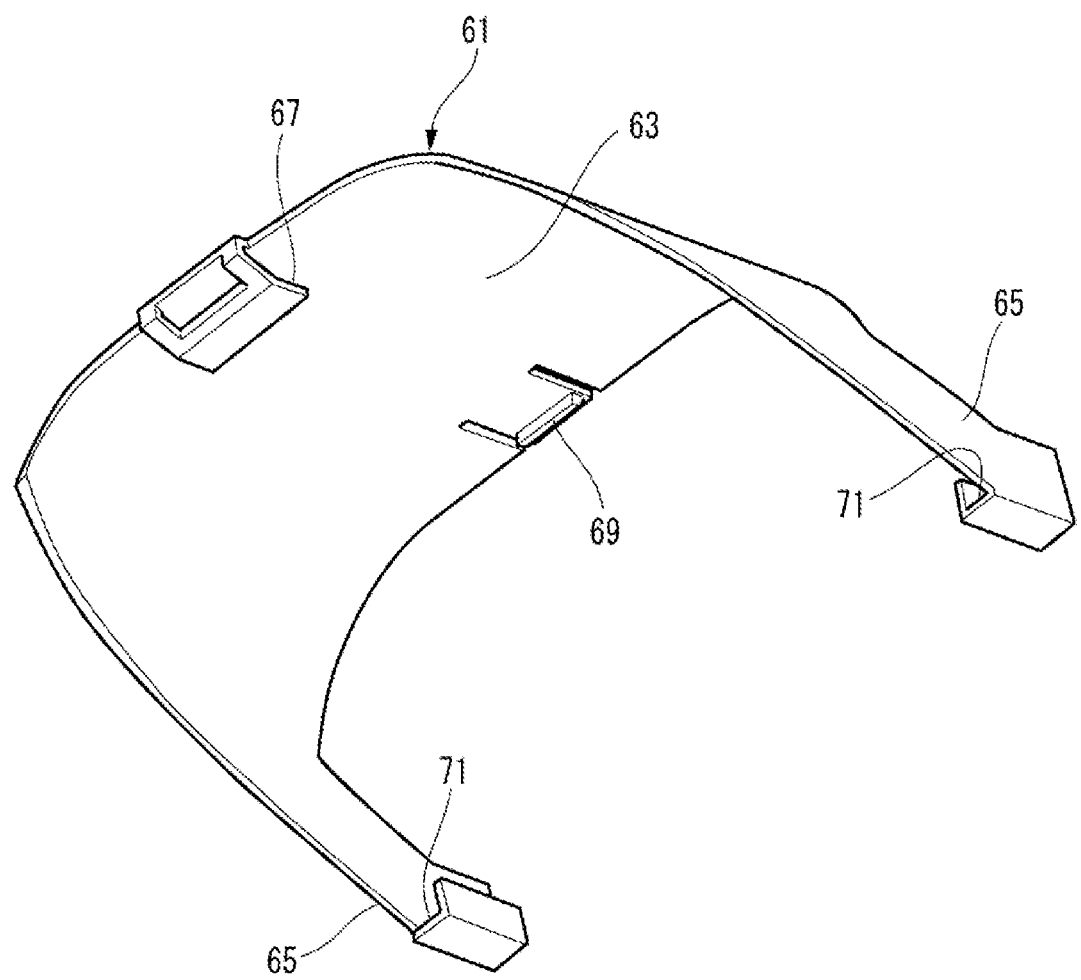
FIG. 8 is a perspective view showing a cap member as viewed obliquely from below.

FIG. 8 is a perspective view showing the cap member 61 as viewed obliquely from below. A rear end locking claw 69 is formed on the cap main body portion 63 at an opposite side of the tip end locking plate 67. Each of the side plate locking arms 65 at both sides is formed with an engagement groove portion 71 for receiving the side plate portion 51 from below.

Figure 9:
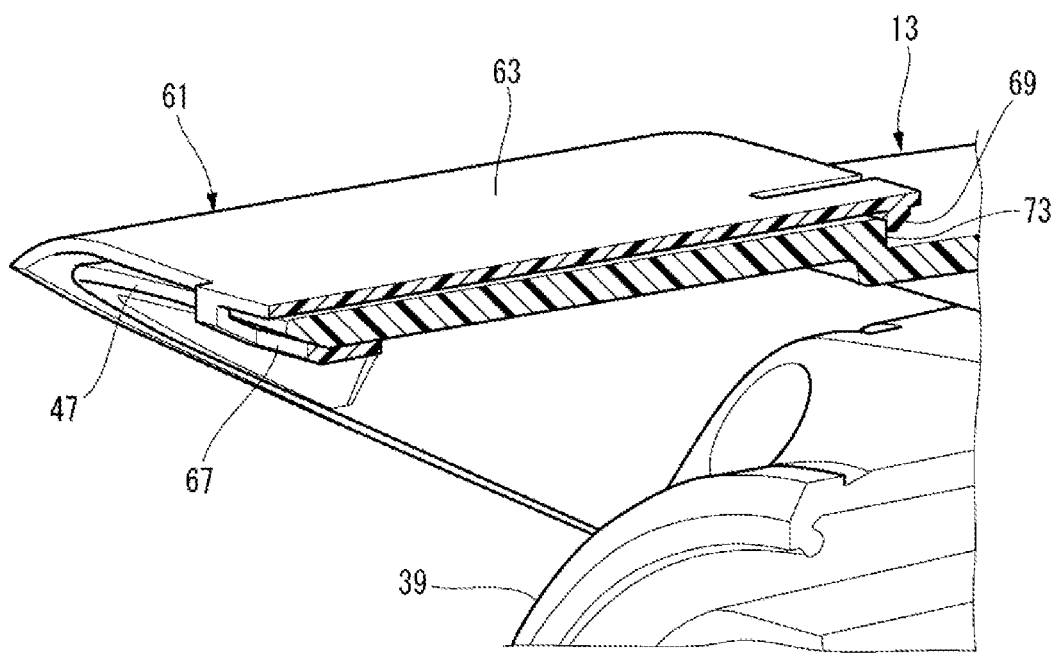
FIG. 9 is a cross sectional view showing an upper locking structure of the cap member.

FIG. 9 is a cross sectional view showing an upper locking structure of the cap member 61. When the rear end locking claw 69 is locked to a step portion 73 of the tip end flange portion 47, the cap member 61 is restricted from coming off forward. That is, the tip end of the cap member 61 is restricted from rising up and moving in the front-rear direction by the tip end locking plate 67 and the rear end locking claw 69.

Figure 10:
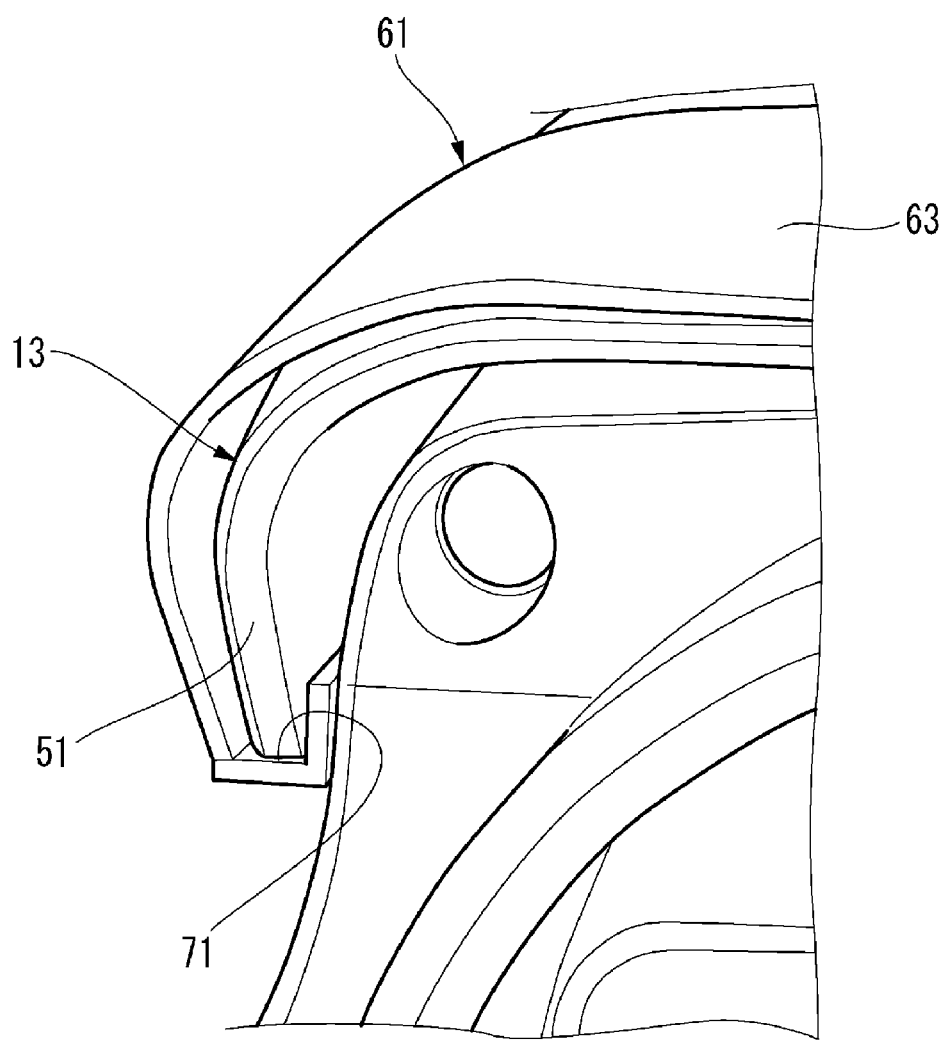
FIG. 10 is an enlarged perspective view showing main parts of a side locking structure of the cap member.

FIG. 10 is an enlarged perspective view showing main parts of a side locking structure of the cap member 61. Further, the engagement groove portions 71 formed in the side plate locking arms 65 at both sides of the cap member 61 are engaged with the left and right side plate portions 51 from below, so that a rear end of the cap member 61 can be restricted from rising up, and the cap member 61 can be reliably mounted so that the cap member 61 does not easily fall off even by wind pressure or the like.

Next, an operation of the monitoring camera 100A according to the modification of the first embodiment will be described.

In the monitoring camera 100A, the repellent member is the cap member 61 that is made of resin and is molded to contain a drug, and the cap member 61 is detachably attached to the upper surface of the tip end flange portion 47.

In the monitoring camera 10A, the repellent member is the cap member 61 that is made of resin and is molded to contain a drug. The cap member 61 is detachably attached to the tip end flange portion 47. Since the repellent member is the cap member 61, the repellent member is inconspicuous, and the appearance of the monitoring camera 100A is not impaired. Since there is no protruding member from the housing 11, there is no vibration of the housing 11 caused by a wind pressure acting on the repellent member. Furthermore, since the cap member 61 in which drug efficacy is lowered can be removed from the tip end flange portion 47 and discarded, can be replaced with a new cap member 61 and mounted to the tip end flange portion 47, drug efficacy can be easily updated. As a result, the monitoring camera 100A can constantly maintain optimal drug efficacy.

Second Embodiment

Next, a monitoring camera 200 according to a second embodiment will be described. In a monitoring camera, it may be desired to avoid a building skeleton located in the vicinity of the monitoring camera and a net stretched from branches of a tree.

Figure 11:
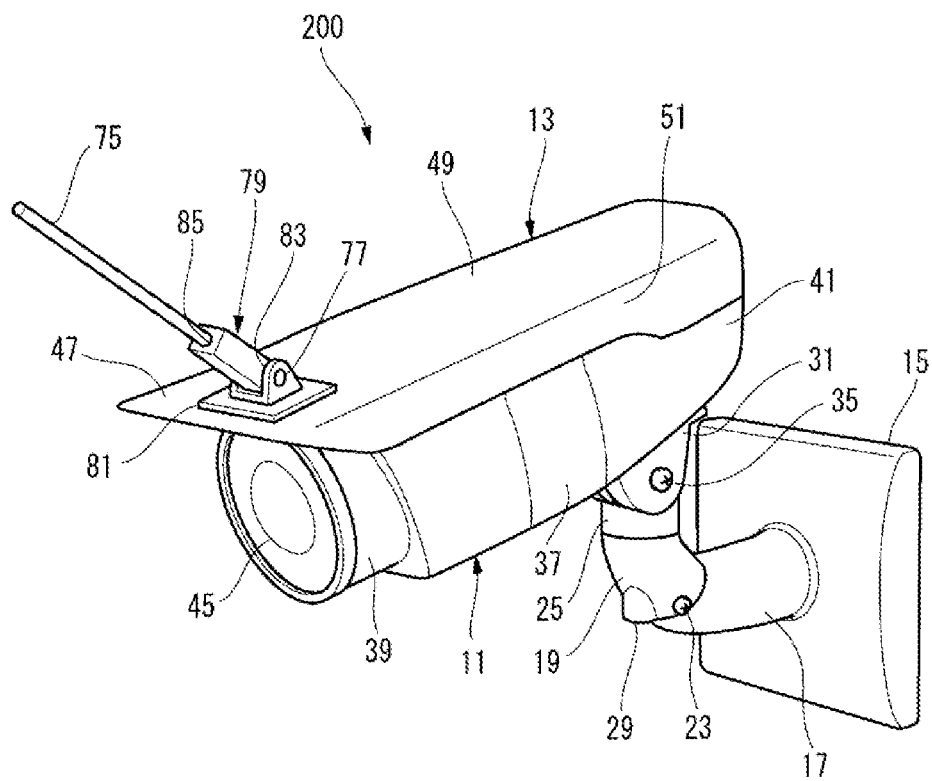
FIG. 11 is a perspective view showing a monitoring camera 200 according to a second embodiment.

FIG. 11 is a perspective view showing the monitoring camera 200 according to the second embodiment. Members and portions in the second embodiment the same as those (specifically, members and portions shown in FIGS. 1 to 4) of the monitoring camera 100 according to the first embodiment are denoted by the same reference numerals, and repeated description thereof will be omitted.

The monitoring camera 200 according to the second embodiment is provided with a rod-shaped repellent member (for example, a bar 75) that is made of resin and protrudes forward from the upper surface of tip end flange portion 47. The bar 75 is provided in a manner of protruding forward from the upper surface of the tip end flange portion 47. The bar 75 is made as a resin molded product in which a drug having an effect of repelling a spider which is the same as the effect according to the first embodiment is added to plastic. The bar 75 may have a round rod shape, a square rod shape, or an elongated rectangular plate shape (an example of a rod shape).

A bar holding portion 79 serving as an example of a repellent member holding portion that can swing around a swing shaft 77 is fixed to the upper surface of the tip end flange portion 47. The bar holding portion 79 includes a base piece 81. The base piece 81 is fixed to the upper surface of the tip end flange portion 47 by a double-sided adhesive tape or the like. A pair of support pieces 83 stand in parallel to the base piece 81, and the support pieces 83 support both ends of the swing shaft 77. The bar holding portion 79 is swingably supported by the swing shaft 77. A holding hole 85 into which a base end of the bar 75 is inserted is formed in the bar holding portion 79. The bar 75 is detachably attached to the holding hole 85. For the bar holding portion 79, for example, a screw shaft can be used as the swing shaft 77. The screw shaft passes through the pair of support pieces 83 and is screwed into a nut, so that the pair of support pieces 83 can be tightened and the bar 75 can be fixed at a predetermined swing angle.

Figure 12:
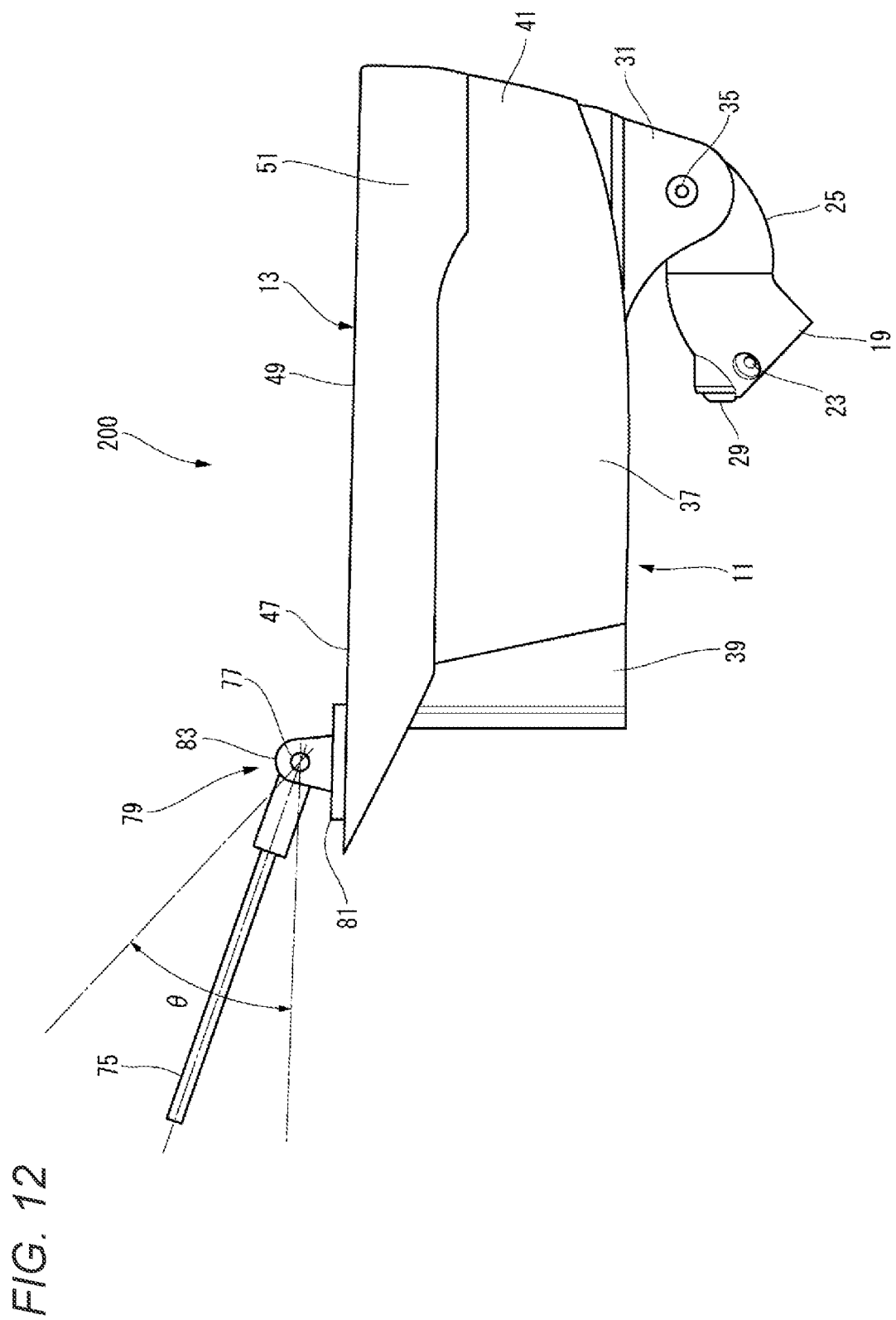
FIG. 12 is a side view showing the monitoring camera 200 shown in FIG. 11.

FIG. 12 is a side view showing the monitoring camera 200 shown in FIG. 11. When the monitoring camera 200 captures an image of a distant subject, an optical system including the camera lens 43 is set to a telephoto side having a long focal length. On the other hand, when an image of a relatively close subject is captured, the optical system including the camera lens 43 is set to a wide angle side having a short focal length. In a case where the optical system is set to the telephoto side, when an optical axis is horizontal, an elevation angle and a dip angle of the camera lens 43 relative to the optical axis are small (for example, about 20 degrees). On the other hand, in a case where the optical system is set to the wide angle side, when the optical axis is horizontal, the elevation angle and the dip angle of the camera lens 43 relative to the optical axis are large (for example, about 45 degrees).

The bar 75 that is provided in a manner of protruding forward from the upper surface of the tip end flange portion 47 is disposed such that the swing angle of the bar 75 is adjusted in a predetermined angle range θ (see FIG. 12), so that the bar 75 is disposed above a range of the elevation angle, and the bar 75 is disposed so as not to be reflected in a captured image.

Next, an operation of the monitoring camera 200 according to the second embodiment will be described.

The monitoring camera 200 includes the housing 11 in which the front glass 45 closes the tip end cylindrical portion 39 in which the camera lens 43 is disposed, the eave member 13 that is provided on the upper surface of the housing 11 and of which the tip end flange portion 47 protrudes forward from the front glass 45, and the rod-shaped repellent member that is provided in a manner of protruding forward from the upper surface of the tip end flange portion 47, is made of resin, and is molded to contain a drug for repelling a spider.

In the monitoring camera 200, a camera having the camera lens 43 is housed in the housing 11. The housing 11 has, for example, the cylindrical tip end cylindrical portion 39 at a tip end of the box-shaped main body case 37. The camera lens 43 is disposed inside the tip end cylindrical portion 39 along an optical axis and on the axis. The tip end cylindrical portion 39 is closed by the front glass 45 in front of the camera lens 43. That is, in the monitoring camera 200, the camera lens 43 forms an image on a light receiving surface of an imaging element using light passing through the front glass 45. Instead of the front glass 45, the camera lens 43 may be disposed at the forefront of the camera. In addition, the housing 11 may include an LED for nighttime illumination and a moving object detection sensor.

The eave member 13 having the tip end flange portion 47 is provided on the upper surface of the housing 11. When the eave member 13 is attached to the upper surface of the housing 11, the tip end flange portion 47 is disposed in a manner of protruding forward from the front glass 45. Accordingly, the eave member 13 can shield sunlight that is directly incident on the camera lens 43.

The tip end flange portion 47 is provided with the bar 75. The bar 75 is provided in a manner of protruding forward from the upper surface of the tip end flange portion 47. The bar 75 is made as a resin molded product in which a drug having an effect of repelling a spider which is the same as described above is added to plastic. The bar 75 may have a round rod shape, a square rod shape, or an elongated rectangular plate shape. The rod-shaped bar 75 can reduce wind resistance and prevent the vibration of the housing 11 during strong wind. The plate-shaped bar 75 can increase a drug efficacy area in contact with air in a space above the tip end flange portion 47, and can improve the effect of repelling a spider.

In the monitoring camera 200, since the bar 75 is provided on the upper surface of the tip end flange portion 47, no spider is likely to come close to the tip end flange portion 47 that protrudes upward in front of the front glass 45. Since no spider comes close to the tip end flange portion 47, base yarns (yarns roughly stretched from the center of a web serving as a base when weft yarns of a circular web are to be set up) or the like are not set up. As a result, it is less likely to set up a spider web that is stretched from at least the tip end flange portion 47 and serves as an obstacle in front of the front glass 45. These effects are considered to be similar not only to a circular web but also to other types of nets such as an inventory net, an irregular net, a dish net, a fan net, and a strip net.

As a result, since an obstacle such as a spider web is less likely to be set up in front of the front glass 45, blocking of imaging light is prevented, and deterioration of image quality of a subject is prevented in the monitoring camera 200. Since it is not necessary to manually remove the obstacle such as a spider web, it is possible to significantly reduce the labor of maintenance work for maintaining a monitoring function and the risk of work at height.

In addition, since an obstacle such as a spider web is less likely to be set up in front of the camera lens 43, it is less likely that a moving object detection sensor is operated due to imaging light since the spider web or a prey entangled in the spider web, or the like is moved due to wind. As a result, it is possible to prevent the issuing of a false alarm and it is possible to prevent deterioration of monitoring accuracy.

Further, the bar 75 protrudes into a wide space in front of and above the tip end flange portion 47 in the monitoring camera 200, drug efficacy can be exerted as compared with a case where only the upper surface of the tip end flange 47 is used as an installation area of the repellent member. The number of bars 75 may be one, and it is possible to improve the drug efficacy and improve the effect for repelling a spider by providing a plurality of bars 75.

Accordingly, the monitoring camera 200 can avoid a building skeleton located in the vicinity of the monitoring camera 200 and a net stretched from branches of a tree without being limited to the eave member 13 only.

In the monitoring camera 200, the bar holding portion 79 that is swingable about the swing shaft 77 is fixed to the upper surface of the tip end flange portion 47, and the base end of the bar 75 is detachably attached to the holding hole 85 formed in the bar holding portion 79.

In the monitoring camera 200, the bar holding portion 79 is fixed to the upper surface of the tip end flange portion 47. The holding hole 85 for holding the base end of the bar 75 is formed in the bar holding portion 79. The base end of the bar 75 is inserted into the holding hole 85, so that the bar 75 is supported by the tip end flange portion 47 via the bar holding portion 79.

Here, the bar holding portion 79 is swingable about the swing shaft 77 in a direction along the upper surface of the tip end flange portion 47. An angle between the bar 75 and the optical axis of the camera lens 43 can be adjusted.

As described above, in a case where the optical axis is horizontal, the elevation angle and the dip angle of the camera lens 43 relative to the optical axis are small when the monitoring camera 200 is set to the telephoto side, and the elevation angle and the dip angle of the camera lens 43 relative to the optical axis are large when the monitoring camera 200 is set to the wide angle side.

The monitoring camera 200 can swing the bar holding portion 79 to dispose the bar 75 above a range of the elevation angle in accordance with a case where the monitoring camera 200 is set to the telephoto side and a case where the monitoring camera 200 is set to the wide angle side. As a result, the monitoring camera 200 can adjust the bar 75 to an optimum position so that the bar 75 is not reflected in a captured image in accordance with a case where the monitoring camera 200 is set to the telephoto side and a case where the monitoring camera 200 is set to the wide angle side. Since the bar 75 in which drug efficacy is lowered can be removed from the holding hole 85 and discarded, can be replaced with a new bar 75 and inserted into the holding hole 85, drug efficacy can be easily updated. As a result, the monitoring camera 200 can constantly maintain optimal drug efficacy at an appropriate position.

Third Embodiment

Next, a monitoring camera 300 according to a third embodiment will be described. In a monitoring camera, it may be desired to save time and effort for replacing a repellent member and enable maintenance-free for a spider web removal operation.

Figure 13:
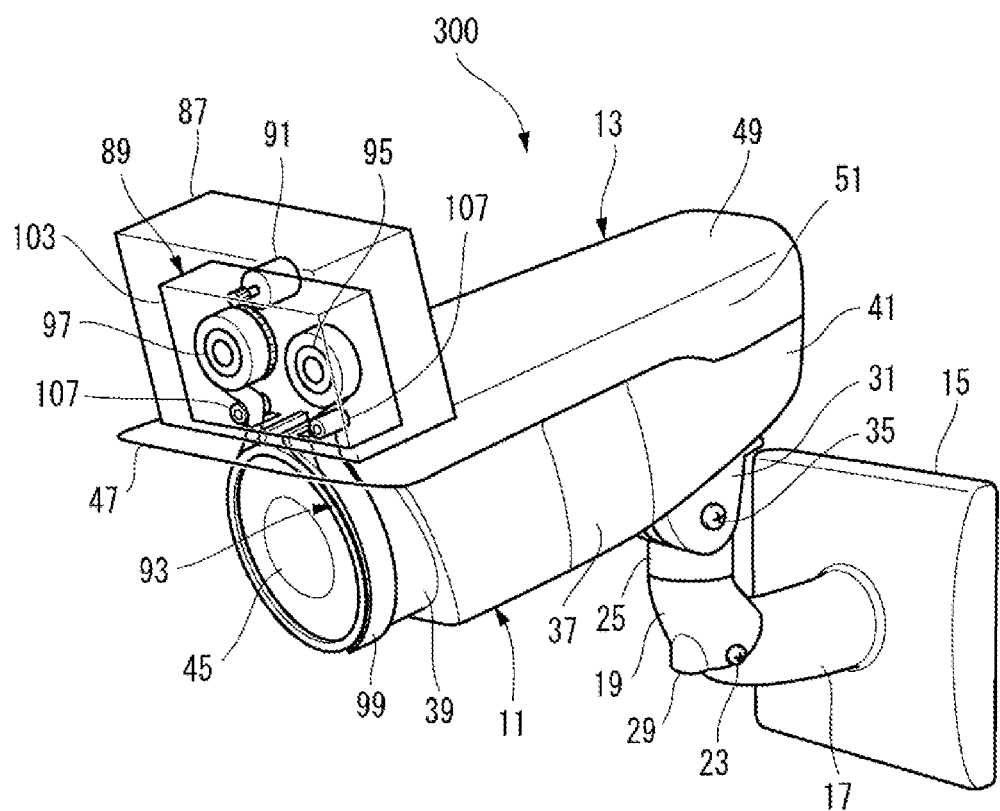
FIG. 13 is a perspective view showing a monitoring camera 300 according to a third embodiment.

FIG. 13 is a perspective view showing the monitoring camera 300 according to the third embodiment. Members and portions in the third embodiment the same as those (specifically, members and portions shown in FIGS. 1 to 4) of the monitoring camera 100 according to the first embodiment are denoted by the same reference numerals, and repeated description thereof will be omitted.

The monitoring camera 300 according to the third embodiment mainly includes a case 87, a tape cartridge 89, a winding motor 91, and a tape guide 93.

The case 87 is attached to the upper surface of the tip end flange portion 47. The tape cartridge 89 and the winding motor 91 are housed in the case 87. The case 87 may house a battery (not shown) that supplies power to the winding motor 91 or a motor control circuit. Alternatively, the monitoring camera 300 may be supplied with power from a power supply unit (not shown) housed in the housing 11 of the monitoring camera 300. In this case, it is not necessary to house a battery in the case 87.

The tape cartridge 89 housed in the case 87 includes a supply reel 95 and a winding reel 97 inside the tape cartridge 89. A long tape member 99 is wound around the supply reel 95 and the long tape member 99 contains a drug having an effect of repelling a spider which is the same as described above. A tip end of the long tape member 99 is fixed to the winding reel 97. The winding motor 91 rotationally drives the winding reel 97 in a tape winding direction to wind the long tape member 99 wound around the supply reel 95 around the winding reel 97.

Figure 14:
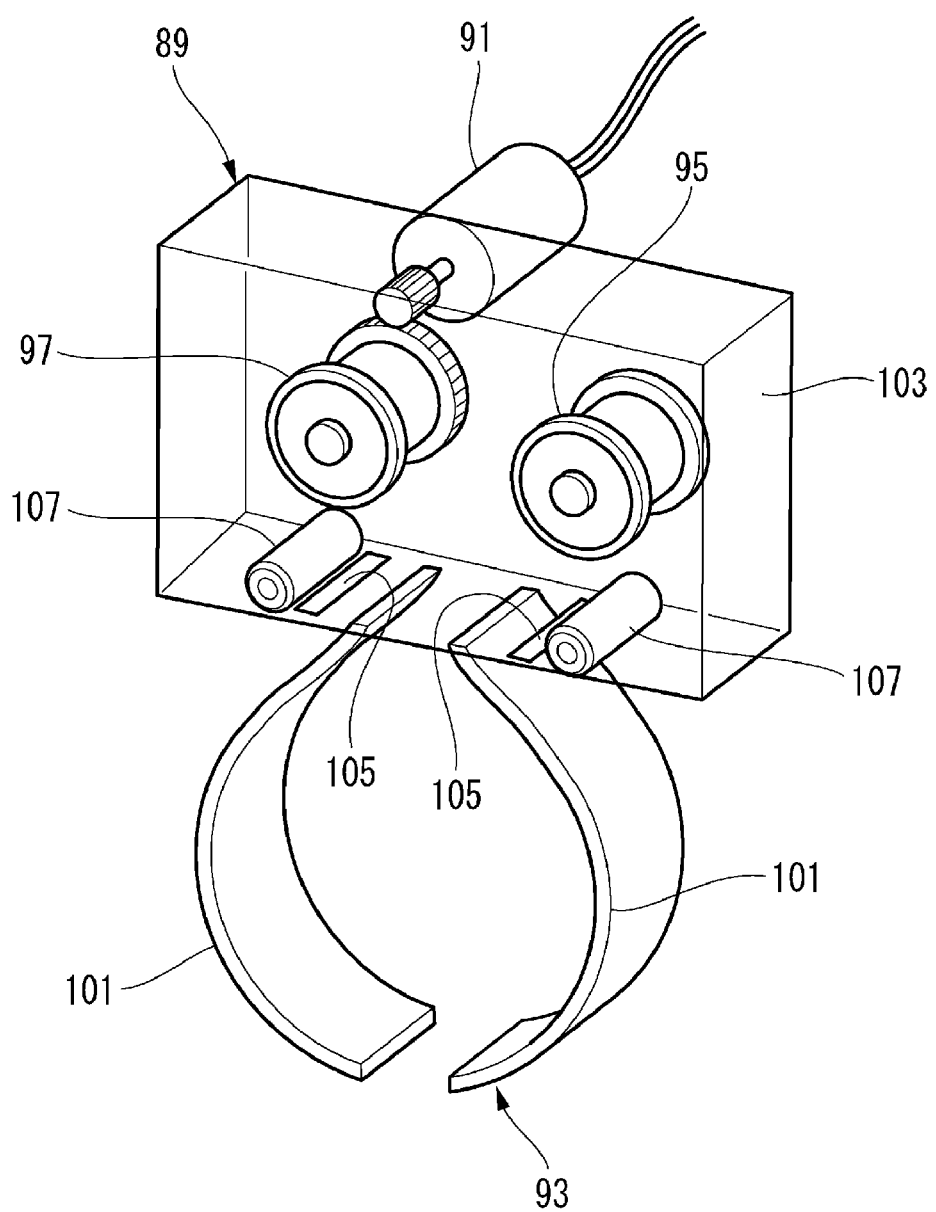
FIG. 14 is a perspective view showing a tape cartridge and a tape guide shown in FIG. 13.

FIG. 14 is a perspective view showing the tape cartridge 89 and the tape guide 93 shown in FIG. 13. A base end of the tape guide 93 is fixed to the case 87. The tape guide 93 has a pair of semicircular arc portions 101, covers substantially a half of an outer periphery of the tip end cylindrical portion 39, and the pair of semicircular arc portions 101 sandwich the tip end cylindrical portion 39. The tape guide 93 guides the long tape member 99 between the supply reel 95 and the winding reel 97 to move along the outer periphery of the tip end cylindrical portion 39.

A pair of slit openings 105 are formed on a lower surface of a cartridge case 103 and the long tape member 99 between the supply reel 95 and the winding reel 97 are drawn out through the slit openings 105 to the outside (downward) of the cartridge case 103, and a detour traveling path is formed. The pair of slit openings 105 are provided in the vicinity of the supply reel 95 and in the vicinity of the winding reel 97 and the pair of slit openings 105 are separated from each other. The slit opening portions 105 may be an opening portion in which the pair of slit opening portions 105 are connected into one.

A tip end side of the long tape member 99 wound around the supply reel 95 is temporarily drawn out of the cartridge case from the slit opening portion 105 in the vicinity of the supply reel 95. After the long tape member 99 that was drawn out travels on the outer periphery of the tape guide 93, the long tape member 99 is drawn into the cartridge case 103 from the slit opening 105 in the vicinity of the winding reel 97 and is wound around the winding reel 97. A plurality of guide rollers 107 may be provided inside the cartridge case 103 to form a travel path of the long tape member 99.

The monitoring camera 300 may include a temperature sensor, a timer, and a tape winding control unit. The tape winding control unit drives and controls the winding motor 91 based on detection signals and count values from the temperature sensor and the timer. The monitoring camera 300 causes the tape winding control unit to control the winding motor 91, so that the monitoring camera 300 can set a winding schedule in a manner in which the long tape member 99 is automatically wound, for example, once a week in a period other than winter when no spider web is set up.

Next, an operation of the monitoring camera 30) according to the third embodiment will be described.

The monitoring camera 300 includes the housing 11 in which the front glass 45 closes the tip end cylindrical portion 39 in which the camera lens 43 is disposed, the eave member 13 that is provided on the upper surface of the housing 11 and of which the tip end flange portion 47 protrudes forward from the front glass 45, the case 87 that is attached to the upper surface of the tip end flange portion 47, the tape cartridge 89 that is mounted in the case and in which the tip end of the long tape member 99 containing a drug for repelling a spider and being wound around the supply reel 95 is fixed to the winding reel 97, the winding motor 91 that is provided in the case and rotationally drives the winding reel 97 in a tape winding direction, and a tape guide 93 of which the base end is fixed to the case 87, that covers substantially a half of the outer periphery of the tip end cylindrical portion 39 and sandwich the tip end cylindrical portion 39, and that guides the long tape member 99 between the supply reel 95 and the winding reel 97 to travel along the outer periphery of the tip end cylindrical portion 39.

In the monitoring camera 300, a camera having the camera lens 43 is housed in the housing 11. The housing 11 has, for example, the cylindrical tip end cylindrical portion 39 at a tip end of the box-shaped main body case 37. The camera lens 43 is disposed inside the tip end cylindrical portion 39 along an optical axis and on the axis. The tip end cylindrical portion 39 is closed by the front glass 45 in front of the camera lens 43. That is, in the monitoring camera 300, the camera lens 43 forms an image on a light receiving surface of an imaging element using light passing through the front glass 45. Instead of the front glass 45, the camera lens 43 may be disposed at the forefront of the camera. In addition, the housing 11 may include an LED for nighttime illumination and a moving object detection sensor.

The eave member 13 having the tip end flange portion 47 is provided on the upper surface of the housing 11. When the eave member 13 is attached to the upper surface of the housing 11, the tip end flange portion 47 is disposed in a manner of protruding forward from the front glass 45. Accordingly, the eave member 13 can shield sunlight that is directly incident on the camera lens 43.

The tip end flange portion 47 is provided with the case 87. The case 87 is, for example, detachably attached to the upper surface of the tip end flange portion 47. The case 87 houses the tape cartridge 89 and the winding motor 91, and fixes the tape guide 93 to a lower portion of the case 87. The cartridge case 103 of the tape cartridge 89 is formed into a flat rectangular box shape. The cartridge case 103 is disposed such that a thickness direction of the cartridge case 103 is a direction along the optical axis of the camera lens 43, and a long side of the cartridge case 103 extends in a direction along the upper surface of the tip end flange portion 47.

A rotation shaft portion of the supply reel 95 and a rotation shaft portion of the winding reel 97 are separated from each other in a direction along the long side of the cartridge case 103, and are rotatably held. A rotation center of each rotation shaft portion is in a direction along the optical axis of the camera lens 43.

The long tape member 99 formed to contain a drug for repelling a spider is wound around the supply reel 95. The tip end of the long tape member 99 is fixed to an outer periphery of the rotation shaft portion of the winding reel 97. The rotation shaft portion to which the tip end of the long tape member 99 is fixed is rotationally driven in a direction in which the long tape member 99 is wound by the winding motor 91 provided in the case.

The tape guide 93 is fixed to the lower surface of the cartridge case 103 between the pair of slit openings 105. The tape guide 93 covers substantially a half of the outer periphery of the tip end cylindrical portion 39 and sandwiches the tip end cylindrical portion 39. The tape guide 93 is formed of, for example, a spring steel material having a spring property or a hard resin material, and is curved into a substantially semicircular arc shape. The tape guide 93 has elasticity and can sandwich the outer periphery of the tip end cylindrical portion 39 with a predetermined sandwiching force.

The tape guide 93 guides the long tape member 99 to travel along an outer peripherical surface of the tape guide 93 in the detour traveling path in a period from when the long tape member 99 is drawn out from the slit opening 105 of the supply reel 95 up to when the long tape member 99 is drawn in from the slit opening 105 of the winding reel 97. A passing slit through which the long tape member 99 passes between each slit opening portion 105 and the tape guide 93 is formed by cutting from the tip end of the tip end flange portion 47.

In the monitoring camera 300, when the winding motor 91 drives the winding reel 97 to start winding, the long tape member 99 wound around the tape guide 93 is drawn from the slit opening portion 105 and wound around the winding reel 97. A winding length of the long tape member 99 may be a length of the detour traveling path extending over the tape guide 93. The long tape member 99 of the length of the detour traveling path is wound around the winding reel 97, the long tape member 99 of the same length is unwound from the supply reel 95 and is newly disposed on the detour traveling path on the tape guide.

In the monitoring camera 300, since the long tape member 99 to which a drug for repelling a spider is added is provided on the outer periphery of the tip end cylindrical portion 39, no spider is likely to come close to the vicinity of the front glass 45. Since no spider comes close to the tip end cylindrical portion 39, base yarns (yams roughly stretched from the center of a web serving as a base when weft yarns of a circular web are to be set up) or the like are not set up. As a result, it is less likely to set up a spider web that is stretched from at least the tip end cylindrical portion 39 and serves as an obstacle in front of the front glass 45. These effects are considered to be similar not only to a circular web but also to other types of nets such as an inventory net, an irregular net, a dish net, a fan net, and a strip net.

As a result, since an obstacle such as a spider web is less likely to be set up in front of the front glass 45, blocking of imaging light is prevented, and deterioration of image quality of a subject is prevented in the monitoring camera 300. Since it is not necessary to manually remove the obstacle such as a spider web, it is possible to significantly reduce the labor of maintenance work for maintaining a monitoring function and the risk of work at height.

In addition, since an obstacle such as a spider web is less likely to be set up in front of the camera lens 43, it is less likely that a moving object detection sensor is operated due to imaging light since the spider web or a prey entangled in the spider web, or the like is moved due to wind. As a result, it is possible to prevent the issuing of a false alarm and it is possible to prevent deterioration of monitoring accuracy.

Further, in the monitoring camera 300, the winding motor 91 is driven to wind the long tape member 99, the long tape member 99 that is exposed to the external environment and in which drug efficacy is lowered can be replaced with a new portion, and the drug efficacy can be easily updated. As a result, the monitoring camera 300 can constantly maintain optimal drug efficacy and can obtain the effect of repelling a spider stably for a long period. As a result, it is possible to save time and effort to replace the repellent member, and it is possible to enable maintenance-free for a spider web removal operation.

Therefore, according to the monitoring camera 100, the monitoring camera 100A, the monitoring camera 200, and the monitoring camera 300 according to the embodiments described above, it is possible to prevent deterioration of image quality and deterioration of monitoring accuracy.

Although various embodiments are described above with reference to the drawings, it is needless to say that the present disclosure is not limited to such examples. It will be apparent to those skilled in the art that various alterations, modifications, substitutions, additions, deletions, and equivalents can be conceived within the scope of the claims, and it should be understood that such changes also belong to the technical scope of the present disclosure. Components in various embodiments described above may be combined freely within a range not deviating from the spirit of the invention.

Figure 15:
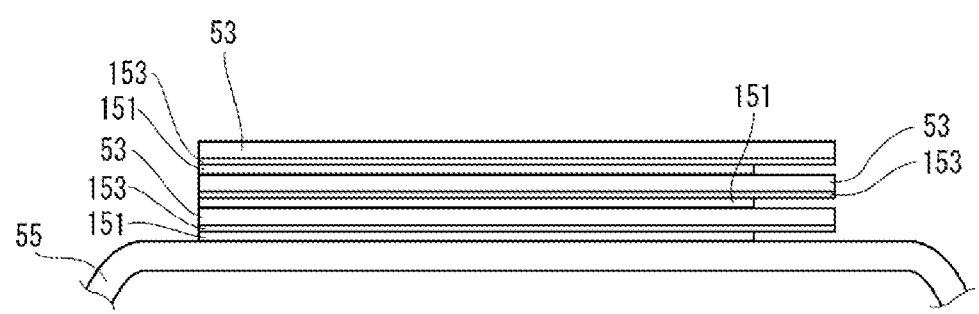
FIG. 15 is a side view showing a monitoring camera in which a large number of sheet members according to the first embodiment are stacked.

In the first embodiment described above, when the sheet member 53 includes multiple layers (see FIG. 15) and an effective period of a repelling effect for repelling a pest by a drug expires, the sheet member 53 is peeled one by one from the top, the sheet member 53 in a lower layer is exposed, and the effective period for repelling a pest can be substantially extended. FIG. 15 is a side view showing the monitoring camera 100 according to the first embodiment in which a large number of sheet members are stacked. In the monitoring camera 100 according to the first embodiment, the sheet member 53 may has a single layer structure, or may has a stacked structure including a plurality of layers as shown in FIG. 15. The repelling effect for repelling a pest by a drug contained in the sheet member 53 may be deteriorated mainly by ultraviolet rays.

Therefore, the sheet member 53, an ultraviolet shielding sheet 153, and a double-sided tape 151 may be similarly and repeatedly stacked in an order of the sheet member 53, the ultraviolet shielding sheet 153, and the double-sided tape 151 from an upper stage side (in other words, a side farthest from a bottom surface of the side surface 55) toward a lower stage side (in other words, a bottom surface side of the side surface 55). FIG. 15 shows an example of a configuration in which one set of the sheet member 53, the ultraviolet shielding sheet 153, and the double-sided tape 151 is stacked in three layers.

In FIG. 15, an area of the double-sided tape 151 is smaller than an area of the ultraviolet shielding sheet 153 in consideration of the ease of peeling. Alternatively, the area of the double-sided tape 151 may be the same as the area of the ultraviolet shielding sheet 153. In this case, the double-sided tape 151 is attached to the bottom surface of the side surface 55. That is, when it is confirmed that the sheet member 53 deteriorates at the time of maintenance or the like, the sheet member 53 may be peeled off at any time by an operator by hand. Instead of the ultraviolet shielding sheet 153, a print pattern having an ultraviolet shielding function may be used. As a result, since the sheet member 53 which is at a lower stage of the ultraviolet shielding sheet 153 is shielded from ultraviolet rays, after the sheet member 53 at an upper stage side (that is, the sheet member 53 in which the effect for repelling a pest by a drug deteriorates) is peeled off, the sheet member that is less deteriorated by ultraviolet rays can be exposed.

The present application is based on the Japanese Patent Application No. 2020-035962 filed on Mar. 3, 2020, and the contents thereof are incorporated by reference in the present application.

INDUSTRIAL APPLICABILITY

The present disclosure is useful as a monitoring camera that prevents deterioration of image quality of a captured image and deterioration of monitoring accuracy.

REFERENCE SIGNS LIST 11 housing
13 eave member
39 tip end cylindrical portion
43 camera lens
45 front glass
47 tip end flange portion
53 sheet member
55 side surface
57 tape member
61 cap member
75 bar
77 swing shaft
79 bar holding portion
85 holding hole
87 case
89 tape cartridge
91 winding motor
93 tape guide
95 supply reel
97 winding reel
99 long tape member
100, 100A, 200, 300 monitoring camera

The invention claimed is:

1. A monitoring camera comprising:
a housing having a tip end cylindrical portion in which a lens is disposed, the tip end cylindrical portion being covered with a front glass;
an eave member that is provided on an upper surface of the housing and that has a tip end flange portion protruding forward from the front glass; and
a repellent member that is provided at the tip end flange portion and contains a drug for repelling a pest such as a spider,
wherein the repellent member includes a sheet member that is formed into a sheet shape and has an adhesive layer on one surface of the sheet member, and
wherein the sheet member is bonded to at least an upper surface of the tip end flange portion and a side surface of the tip end flange portion.

2. The monitoring camera according to claim 1, further comprising
the a second repellent member including a tape member that contains the drug, is formed into a band shape, and has an adhesive layer on one surface of the tape member, and
wherein the tape member is bonded to an outer periphery of the tip end cylindrical portion.

3. The monitoring camera according to claim 2, wherein a width of the tape member has a value of 10 mm or 1/10 of a diameter of the tip end cylindrical portion, whichever is greater.

4. The monitoring camera according to claim 3, wherein the width of the tape member is 10 mm or more.

5. The monitoring camera according to claim 3, where the diameter of the tip end cylindrical portion is 100 mm or more.

6. The monitoring camera according to claim 1, wherein the repellent member includes a resin cap member containing the drug, and
wherein the cap member is detachably attached to an upper surface of the tip end flange portion.

* * * * *